July 7, 1953  A. SHMUKLER ET AL  2,644,233
ARTICULATOR
Filed Nov. 7, 1950  2 Sheets-Sheet 1
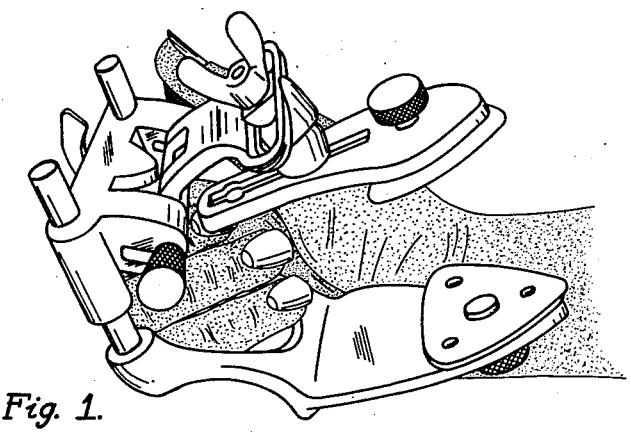
Fig. 1.
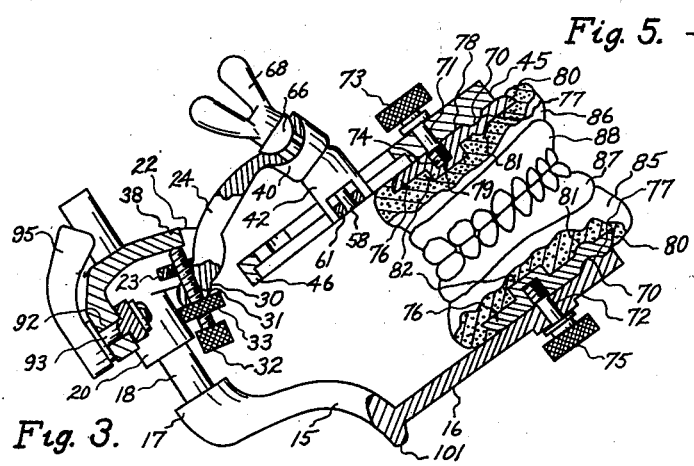
Fig. 3.  Fig. 5.
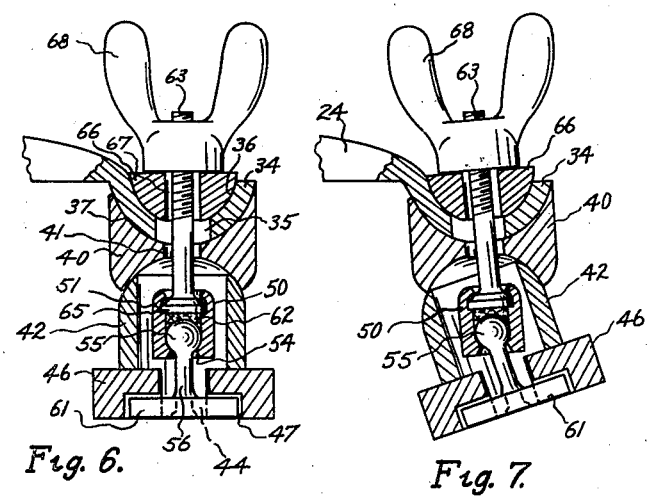
Fig. 6.  Fig. 7.
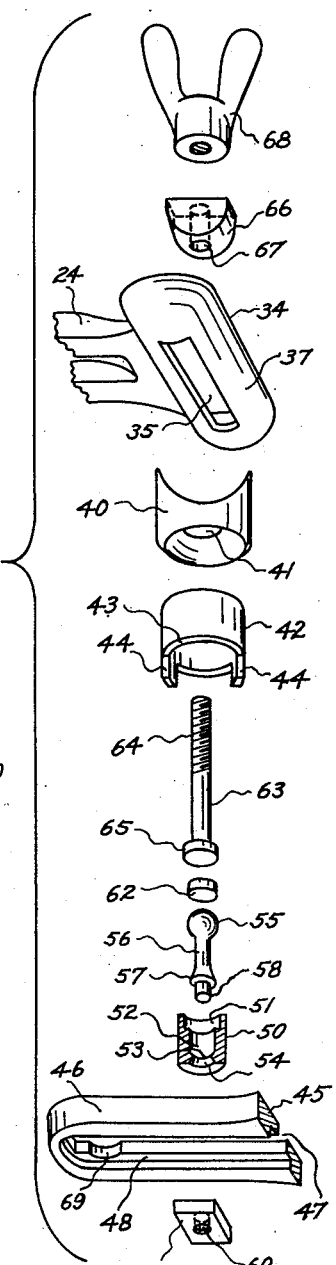
Inventors
Albert Shmukler
Harry Bronstein
By Frank Kahn
Attorney July 7, 1953   A. SHMUKLER ET AL   2,644,233
ARTICULATOR Filed Nov. 7, 1950   2 Sheets-Sheet 2

Inventors
Albert Shmukler
Harry Bronstein
By Frank Kahn
Attorney

Patented July 7, 1953

2,644,233

UNITED STATES PATENT OFFICE 2,644,233

ARTICULATOR

Albert Shmukler and Harry Bronstein,
Philadelphia, Pa.

Application November 7, 1950, Serial No. 194,418

8 Claims. (Cl. 32—32)

This invention relates to the art of denture construction, and more particularly, relates to dental articulators.

In the art of mechanical dentistry, models of human jaws are mounted on an articulator to reproduce the natural relative positions of the jaws. An essential requirement is that the jaw models be mounted on the articulator in such manner that centric occlusion be simulated. The correct bite registration is often not obtained on initial mounting on the articulator. Consequently it is desirable that provision be made for adjustment of the relative configuration of the jaw models on the articulator. In articulators available before the advent of the articulator described and shown in our United States Patent No. 2,423,522 dated July 8, 1947, it was not possible to adjust this relative configuration short of reinvestment of the jaw models in plaster or recasting of the jaw models. Although the articulator illustrated in said Patent No. 2,423,522 provides adjustment of relative configuration of the jaw models in several directions, lateral adjustment was lacking and the amount of adjustment available in the vertical and lateral direction, was occasionally found to be inadequate, particularly in the case of very large jaw models or when the insert was incorrectly positioned in the jaw model casting.

One of the principal objects of our invention is to provide an improved dental articulator for adjustably mounting jaw models with extremely wide limits of adjustment in all possible directions.

Another object of this invention is to provide a dental articulator for mounting jaw models, in which the relative configuration of the models can be lockably adjusted in all possible directions with improved ease and simplicity.

A further object of our invention is to provide an articulator having an upper plate mounted for single-control locking adjustment providing translational movement in two angularly variable paths in separate angularly variable planes.

Another object of our invention is to produce an articulator having an upper mounting plate attached by a locking combination universal joint and dual slide engagement to a retractively movable bracket hinged to a member mounted in locking transverse slidable relationship to a lower mounting plate.

With these and other objects in view which will become apparent from the ensuing description and claims, the following sets forth the details of construction and combination of parts of a specific embodiment of our invention, which we illustrate as an example, and which will best be understood when read in conjunction with the accompanying drawing, in which:

Fig. 1 is a perspective view of our articulator illustrating it as held in the left hand, with bracket in retracted position.

Fig. 3 is a fragmentary side elevational section on the line 3—3 of Fig. 2, showing the articulator with jaw models and restorations in place thereon.

Fig. 5 is an exploded fragmentary view, partly in section, showing the separate parts of the sliding universal joint.

Fig. 6 is an enlarged fragmentary view, partly in section, of the assembled joint of Fig. 5.

Fig. 7 is a view similar to Fig. 6, showing the parts of the joint in different angular relation.

Figure 2:
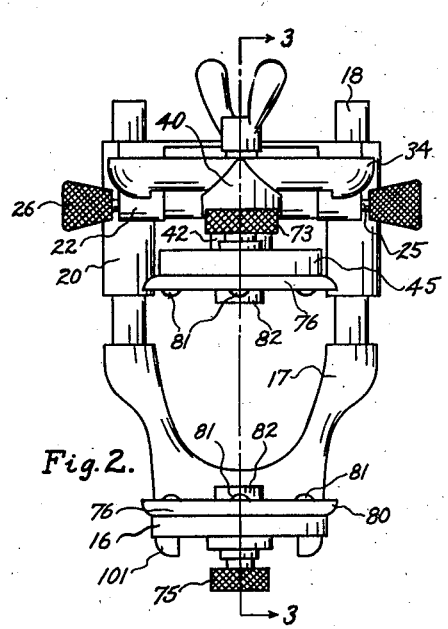
Fig. 2 is a front elevational view of the articulator.

Referring to the drawing, we have shown in Figs. 1 to 4, an articulator base 15 having a forward lower mounting plate 16 and a generally upright rear part 17. The rear part 17 is bifurcated and terminates in parallel cylindrical guide posts 18 extending upwardly at right angles to the plate 16. A transverse post member 20 is provided with cylindrical openings 21 for slidably engaging the posts 18.

Extending forwardly and downwardly from the upper part of the member 20 are two slide bearings 22 adjacent respectively to the ends of the member 20, each having formed laterally therethrough a forwardly and downwardly disposed slot 23. Hinged to the member 20 for oscillation on a transverse axis is the bracket 24 having laterally extending hinge pins 25 terminating in truncated cone bracket knobs 26, which may be knurled as illustrated. The hinge pins 25 are adapted to engage the slots 23 as slide bearing ways. Drilled into each of the bearings 22 from the rear of the member 20 to the forward end of the slot 23 is a cylindrical opening 27 containing a helical spring 28 bearing on the hinge pin 25, the desired degree of pressure being provided by adjustment of a set-screw 29 threaded into the rearward end of the opening 27. When the articulator is held in the hand, rearward pressure on the knob 26 can be conveniently applied with the thumb to retract one side of the bracket 24. Thumb pressure rearwardly on either knob 26 slides the associated pin 25 rearwardly and upwardly along the corresponding bearing way 23, providing lateral oscillation of the bracket 24 about the opposite bearing 22, to aid in checking teeth occlusion. Fig. 1 illustrates the articulator as held in the left hand with the left-hand side of the bracket retracted by rearward pressure on the left-hand bracket knob.

Extending rearwardly and downwardly from the bracket 24 is a central extension 30 provided with a generally vertically disposed threaded opening 31. Threaded upwardly through the opening 31 is a thumb screw 32 with locknut 33, the leading end of the screw 32 bearing on the lower surface of a central forward extension 38 of the top portion of the post member 20. The screw 32 thus provides an adjustable lower limit for the oscillable movement of the bracket 24 about the transverse axis.

The bracket 24 carries a combined locking universal and dually slidable joint whose component parts are shown in exploded relation in Fig. 5 and which will now be described in detail. Medially of the front of the bracket 24 is an integrally formed transverse trough portion 34 having along its bottom a relatively wide longitudinal slot 35, and with a cylindrically concave inner surface 36 and cylindrically convex outer surface 37. Mounted beneath the trough 34 is a downwardly extending generally cylindrical upper cup member 40 with a coaxial bore 41, having a cylindrically concave upward surface adapted to engage the trough 34 and a spherically concave lower surface. A downwardly extending hollow cylindrical lower cup member 42 has a spherically convex upper surface engaging the lower surface of the upper cup member 40. The bottom surface 43 of the lower cup member 42 is square with the cylindrical surface thereof except for two diametrically opposite generally rectangular downward extensions 44.

An upper mounting plate 45, disposed generally horizontally, has a rearward portion 46 provided with a longitudinal stepped slot 47 having shoulders 48, the narrower part of the slot being disposed upward. The plate 45 is disposed beneath the lower cup member 42 with the surface 43 thereof in contact with the upper surface of the portion 46 of the plate 45 and with the extensions 44 engaging with a slip fit the upper narrower part of the slot 47 and extending therethrough to the lower surface of the plate 45.

Internally of the assembly of trough 34, upper cup member 40, lower cup member 42 and upper mounting plate 45, and holding them together in the desired relative configuration, is a ball-and-socket subassembly. This subassembly comprises a cylindrical socket element 50 disposed generally vertically, having a relatively short axial bore 51 at the top followed by a longer axial bore 52 of smaller diameter terminating in a spherical cup 53 pierced through to the bottom of the element 50 by a downwardly expanding coaxial conical aperture 54. The ball element 55 of the ball-and-socket joint seats snugly in the cup 53 and has a generally downwardly extending stem 56 with a slight shoulder 57 near the lower end 58. The end 58 fits tightly into a transverse bore 60 drilled through a rectangular key or slide 61 disposed in and adapted to slide freely along the wider lower part of the stepped slot 47, with the shorter sides of the slide 61 being aligned with the sides of the slot. The lower end of the bore 60 is countersunk and the end 58 of the stem 56 is expanded into this countersink by riveting, swaging or the like, so that slide 61 is rigidly fixed on the stem 56 against the shoulder 57. The slide 61 also fits between the downward extensions 44 of the lower cup member 42 as illustrated in Fig. 3, the longer sides of the slide 61 engaging said extensions 44.

A friction disk 62 of leather or similar material fits on top of the ball element 55 in the bore 52 of the socket element 50 and extends slightly into the bore 51. A cylindrical stem element 63 has a threaded portion 64 at the top and a concentric disk head 65 at the lower end fitting snugly into the bore 51 of the element 50, engaging the shoulder formed between the bore 51 and the bore 52 and compressing the disk 62, with the walls of said bore 51 being swaged over above the head 65 to attach the stem element 63 firmly to the socket element 50 as shown in Figs. 6 and 7. The ball-and-socket joint thus formed is relatively stiff because of the snug fit of the parts and the restoring force in the compressed friction disk 62, and is capable of resisting relatively large tensile forces on said joint.

A trough spacer 66, shaped as a segment of a right cylinder, has its cylindrical surface of such radius of curvature as to slidingly engage the inner surface 36 of the trough 34, and is provided with a diametral through bore 67 perpendicular to its flat side which parallels its cylindrical axis. A locking wing nut 68 engages the threads of the stem element 63 and seats on said flat side of the spacer 66.

Near the rearward end of the slot 47 of the upper mounting plate portion 46, the stepped upper narrower part of the slot 47 is cut away to provide a cylindrical enlargement 69 of the slot, the diameter of said slot enlargement 69 being large enough to permit the socket element 50 to be passed therethrough for assembling the joint, as described in the following.

The relation of the parts and operation of the combined locking universal and dually slidable joint are as follows: The ball-and-socket subassembly, comprising the socket element 50, the ball element 55 with attached slide 61, the friction disk 62, and the stem element 63, is passed upwardly through the slot enlargement 69 until the slide 61 engages the shoulder 48 of the slot 47. The lower cup member 42, whose internal space is considerably larger than and proportioned to contain the socket element 50 in all of its positions with adequate clearance, is then fitted down over the ball-and-socket subassembly with the extensions 44 passing through the upper narrower part of the slot 47 and engaging the slide 61.

The upper cup member 40 is next fitted over the lower cup member 42 with the stem element 63 passing through the bore 41. The trough 34 is then lowered into engagement with the concave upward surface of the upper cup member 40, with the stem element 63 extending upwardly through the slot 35. The trough spacer 66 is now fitted on the stem element 63 which passes through the bore 67, the cylindrical surface of the spacer 66 engaging the inner surface 36 of the trough 34. The wing nut 68 is then screwed on the threaded portion 64 of the stem element 63.

When the nut 68 is tightened, the combined locking universal and dually slidable joint, described in the foregoing, holds the upper mounting plate 45 in rigid relation to the bracket 24 in accordance with the desired relative configuration of these parts. With the nut 68 loosened, the plate 45 is transversely translatable in the plane of the slot 35 of the trough 34, and longitudinally translatable in the plane of the slot 47. These two planes are angularly adjustable with respect to each other by means of the internal ball-and-socket joint and the cup members 40 and 42, as illustrated by the two positions shown respectively in Figs. 6 and 7. In order to provide a very substantial angular adjustment of these two planes, the diameters of the bores 41 and 67 and the width of the slot 35 are suitably dimensioned in excess of the diameter of the stem element 63 to provide appropriately large clearances therefor. It should be noted that for clarity of illustration the upper mounting plate 45 is shown in Figs. 6 and 7 as being rotated on the generally vertical axis of the universal joint so that its longitudinal direction is at a right angle with the longitudinal direction of the bracket 24, whereas in Figs. 1 to 5 these directions are shown as being generally parallel.

The forward part of the plate 45 is of generally triangular shape conforming roughly to the shape of the human jaw. Symmetrically disposed adjacent the triangular vertices of the plate 45 are three downwardly projecting generally spherical protuberances 70 and a central drilled transverse hole 71. The lower plate 16 is similarly shaped with the protuberances 70 projecting upwardly and a central drilled transverse hole 72. A freely rotatable knurled-head thumb-screw 73 is mounted in the opening 71 with the screw-threaded end 74 protruding downwardly. The end 74 is upset to a diameter in excess of the hole 71 to prevent withdrawal of the screw 73 from the plate 45. An upwardly projecting identical screw 75 is similarly mounted in the lower mounting plate 16.

Two triangular insert plates 76 each having three cups 77 formed in one surface 78, appropriately shaped and spaced to engage the protuberances 70 of the plates 16 and 45, and a central blind tapped aperture 79 for engaging the screws 73 and 75, are mounted on the plates 16 and 45. On each insert 76 the surface opposite the surface 78 is provided with a perimetric projection or flange 80, generally spherical protuberances 81 opposite the cups 77, and a cylindrical protuberance 82 coaxial with the aperture 79.

The inserts 76 are cast in with the jaw models as illustrated in Fig. 3, the flanges 80 providing adequate retention. Slipping of the insert from its desired position while casting it into the jaw model, is prevented by the protuberances 81 and 82. The lower jaw model 85 is instantly attachable to the plate 16 by means of the screw 75, and the upper jaw model 86 to plate 45 by means of the screw 73, the protuberances 70 readily engaging the cups 77 to provide proper alignment.

For lockably positioning the post member 20 in any of its possible positions on the posts 18, we provide the locking mechanism illustrated in Figs. 8 to 12, inclusive. The inward sides of the walls of the openings 21 are pierced, at the same height and intermediate of their lengths, by apertures 90 and 91 communicating with the openings 21 on the left and right sides of the member 20 respectively, as viewed from the front of the articulator. The member 20 is provided with a bore 92, generally longitudinal of the articulator, transverse to and centrally disposed between the openings 21 at the level of the apertures 90 and 91. A shaft 93 rotatably engaged in the bore 92, has a generally oval rocking element 94 fixed transversely to its forward end. The shaft 93 extends rearwardly of the member 20 and has a transverse locking lever 95 fixed to its end. A washer 96 is mounted on the shaft 93 between the lever 95 and the member 20. Adjacent each end of the rocking element 94, and pivotally attached thereto for oscillation in the plane of the axes of the openings 21, is a locking pin 97, one engaging the aperture 90 and the other the aperture 91. Each pin 97 is flattened and provided with a transverse eye at the inward or pivot end and is attached to the element 94 by a flat-headed rivet 98 which pivotally engages the eye. The lengthwise ends of the element 94 are transversely recessed to receive the eyes of the pins 97 and to provide relatively large cylindrical bearing surfaces 99 for the eye rims at the inward ends of the pins 97. The pivotal engagement between the pins 97 and the element 94 is thus distributed between the inner and outer cylindrical surfaces of the eye ends of the pins 97 to minimize wearing abrasion of the pivotally engaging surfaces. A stop 100 is fixed to the member 20 to limit the clockwise travel of the element 94, as viewed from the front.

Figure 8:
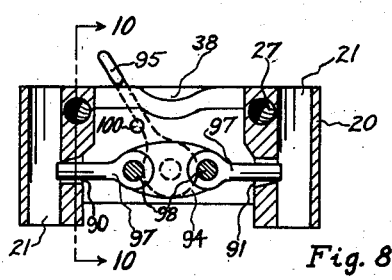
Fig. 8 is a view, partly in section, on the line 8—8 of Fig. 4.
Figure 9:
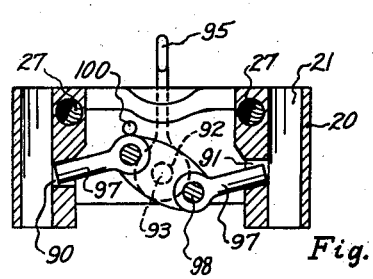
Fig. 9 is a view similar to Fig. 8, showing the post member locking mechanism in unlocked position.
Figure 10:
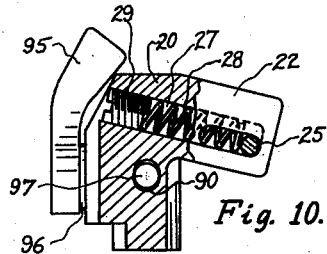
Fig. 10 is an enlarged view of the post member, partly in section, on the line 10—10 of Fig. 8.
Figure 4:
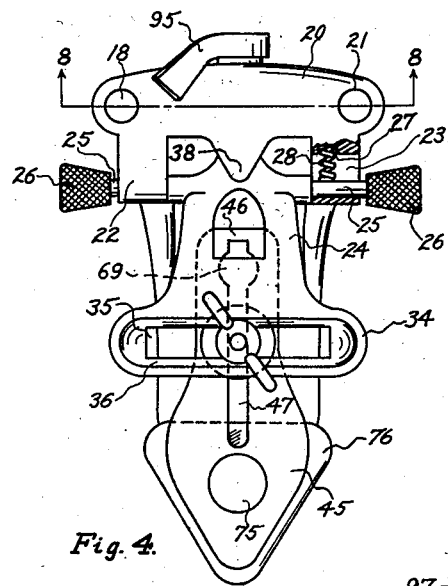
Fig. 4 is a plan view, partly in section, showing our articulator with the locking lever in locked position.
Figure 11:
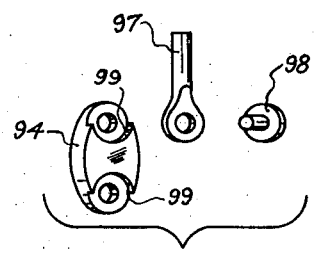
Fig. 11 is an exploded perspective view of part of the post member locking mechanism.
Figure 12:
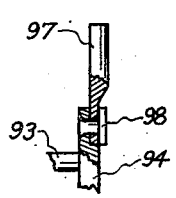
Fig. 12 is a fragmentary view, partly in section, in which the parts of Fig. 11 are shown in assembled relation.

The arrangement of parts and operation of the post member locking mechanism are as follows: With the lever 95 in vertical position as shown in Fig. 9, the element 94 is against the stop 100 and the pins 97 are retracted in the apertures 90 and 91 so that they do not protrude into the openings 21. As the lever 95 is moved counterclockwise as viewed from the front, the pins 97 are forced outwardly into the openings 21 to engage the guide posts 18. In the farthest counterclockwise or locked position, as limited by the forwardly curved outer end of the lever 95 engaging the top surface of the member 20, and as illustrated in Fig. 8, the element 94 is on dead center, with the axes of the pins 97 aligned and coplanar with the axis of the shaft 93. The parts are so proportioned that in this limiting position all lost motion is taken up and there is a substantial pressure of the pins 97 on the posts 18. In this locked position the pressure of the pins 97 will be perpendicular to the posts 18 and there will be no components of force tending to release the mechanism to unlocked position. It is readily understood that this mechanism provides a leverage having considerable mechanical advantage so that relatively light finger pressure to the left, on the outer end of the lever 95, will lock the post member 20 securely in place on the posts 18 and as readily release it when the lever 95 is pushed to the right to its limiting vertical position.

In using our articulator, the desired relative configuration between the jaw models is obtained by fitting the wax bite or check-bite (not illustrated) between the models 85 and 86 in the customary manner. This procedure positions the upper plate 45 exactly where it is desired to be held on the articulator when the bracket 24 is in rest position, that is, when both hinge pins 25 engage the forward ends of the slots 23. With the bracket 24 in rest position, the upper plate 45 is then fixed in the desired relative configuration by suitably adjusting and locking the post member 20 by means of the lever 95 and then tightening the wingnut 68. The screw 32 is then suitably adjusted to fix the lower limit of movement of the plate 45 and then locked in that position with the locknut 33.

The jaw setting thus obtained is more accurate than the present method entailing investment with plaster and is capable of instant reproduction at any time provided the lever 95 and the nut 68 are not loosened and the adjustment of the screw 32 is not changed. It is obvious that the jaw models can be removed and, with the aid of wax bites or dentures for establishing the bite registration, can be replaced with accurate setting on other similar articulators, as often as desired, for grinding in of the restorations 87 and 88 or for other purposes.

Our invention represents an outstanding advance in the art of mechanical dentistry by providing an articulator capable of simple, convenient and almost instant rigid setting over an extremely wide range of adjustment in all possible directions. Furthermore, its shape and proportions are such that when laid on a horizontal surface such as a work bench, desk or table, the base 15 rests on two rounded bottom front feet or rests 101 at the rear of the lower mounting plate 16 and on the rounded lower parts or rests of the bifurcated rear part 17, so that the plate 16 projects forwardly and upwardly as illustrated in Fig. 3. With the articulator so disposed, the restorations 87 and 88 are in the most convenient position for viewing from the front when seated before the bench, desk or table on which the articulator rests. The convenience provided by this feature is of major importance, as will be readily appreciated by workers in this field. The articulator is so proportioned that when in the rest position shown in Fig. 3, with jaw models and restorations in place, the center of gravity of the articulator is rearwardly of the feet 101, thus providing inherent rest stability in this position.

Although the invention has been described in considerable detail, such description is intended as illustrative rather than limiting, as other embodiments will be evident to those skilled in the art, as well as obvious modification in construction and arrangement without departing from the spirit of our invention.

We claim:

1. In an articulator having an upper mounting plate attached to a bracket by a universal joint, means associated with said joint for providing substantial relative translational movement of said plate with respect to said bracket along a first path in the general plane of and laterally transverse to the longitudinal direction of said bracket and along a second path in the general plane of and parallel to the longitudinal direction of said plate, said paths and said planes being respectively angularly variable with respect to each other, and means operable by a single control for locking said plate to said bracket in any of their possible relative positions.

2. In an articulator having an upper mounting plate attached to a bracket by a universal joint having an upper part and a lower part rotatable with respect to each other upon respective axes, said plate being associated with said lower part of the joint and said bracket being associated with said upper part of the joint, and the axis of said upper part of the joint being angularly variable with respect to the axis of said lower part of the joint, first means to provide translational movement of said plate relative to said bracket along a path generally transverse to said axis of said upper part of the joint, second means to provide translational movement of said plate relative to said bracket along a second path transverse to said axis of said lower part of the joint, and single-control means to lock said plate to said bracket in any of the possible translational positions of the plate with respect to the bracket along said paths and in any of the possible angular positions between said axis of said upper part of the joint and said axis of said lower part of the joint.

3. A combined locking universal and dually slidable joint comprising in combination, a top member provided with a trough portion having a longitudinally slotted cylindrical lower surface, a downwardly extending generally cylindrical upper cup member having an axial bore and a cylindrically concave upward surface slidably engageable with said lower surface of the trough portion of the top member and a spherically concave lower surface, a downwardly extending hollow cylindrical lower cup member having a spherically convex upper surface engageable with the lower surface of said upper cup member and two diametral downwardly disposed extensions, a terminal member mounted below said lower cup member and having a slot slidably engageable with said extensions, a ball-and-socket joint having a socket element provided with a threaded stem and having a ball element provided with a stem terminating in a transverse key, a trough spacer surmounting the trough portion of the top member and having a through bore, and a lock nut, said ball-and-socket joint being mounted within said lower cup member with the socket element stem protruding upwardly through the bore in the upper cup member, the slot in the trough portion of the top member, and the bore in the trough spacer and surmounted by and engaging said nut, and with the ball element stem slidably engaged in the terminal member slot with the key below said terminal member slot disposed between and engageable with said lower cup member extensions, and the parts being so proportioned that by tightening the nut the top member and terminal member are lockable in any of their possible relative positions.

4. In an articulator having a base carrying a lower mounting plate forwardly thereof, two parallel cylindrical guide posts mounted on the rear of said base and extending upwardly transverse to said lower mounting plate, a transverse post member having parallel cylindrical openings respectively slidably engageable with said posts for translational movement of said post member transversely to said lower mounting plate, and single-control locking means intermediate of said post member for simultaneously locking said post member to both of said posts.

5. The invention set forth in claim 4 characterized in that said locking means comprises a rocking element fixed to a shaft extending rearwardly through and in pivotal engagement with said post member and terminating in a transverse locking lever, locking pins pivotally attached to opposite ends of said rocking element, the rotational movements of said rocking element and said pins being substantially in the plane of said posts and the ends of said pins being respectively compressively engageable with said posts through suitable apertures in the walls of said cylindrical openings of the post member, and stops on said post member and associated with said rocking element for limiting its movement between a dead-center position in which the pivotal axes of said rocking element and said pins are coplanar and said pins are in pressure engagement with said posts and an off-dead-center position in which said pins are retracted from engagement with said posts, whereby said lever may be selectively positioned to dispose said pins in stable dead-center locking position or in unlocked position with said pins retracted from said posts.

6. In an articulator having a base carrying a lower mounting plate forwardly thereof and a bracket oscillable on a transverse axis and carrying an upper mounting plate forwardly thereof, a transverse member attached to the rear of said base having slide bearings integral with said member and disposed respectively adjacent each end thereof, each of said bearings having formed laterally therethrough a forwardly and downwardly disposed slot, two hinge pins extending respectively laterally from each side of said bracket and each terminating in a knob, said bracket being constructed and arranged such that a portion of said bracket is disposed between said bearings and that said hinge pins are engageable with the respective slots in said bearings as slide bearing ways, said bearings each having a cylindrical opening extending forwardly and downwardly therein from the rear paralleling and communicating with the respective slide bearing way and extending adjacent the forward end thereof, a helical spring disposed within each of said cylindrical openings and bearing upon the respective hinge pin, and a set-screw threaded into the rearward end of each of said cylindrical openings for adjusting pressure upon said hinge pins, whereby rearward pressure on either knob will slide the associated hinge pin rearwardly and upwardly along the corresponding slide bearing way and retract the respective side of the bracket to produce oscillation of the bracket about the bearing on the opposite side of the bracket.

7. In an articulator having a base carrying a lower mounting plate forwardly thereof and a bracket oscillable on a transverse axis and carrying an upper mounting plate forwardly thereof, two parallel cylindrical guide posts mounted on the rear of said base and extending upwardly transverse to said lower mounting plate, a transverse post member slidably engageable with said posts and carrying bearings for oscillable engagement with the bracket, said base being provided with two bottom rests on each lateral side, the forward rest on each side being adjacent the rear of said lower mounting plate and the other adjacent the rear of said base respectively, said lower mounting plate projecting forwardly and upwardly when said rests engage a horizontal surface, jaw model inserts detachably mounted on said plates, jaw models fixed to said inserts, and restorations mounted on said jaw models, said upper mounting plate being adjustable with respect to said lower mounting plate such that said restorations may be positioned in occlusive engagement with each other, and the center of gravity of the articulator being rearward of the forward pair of rests when the rests are in engagement with a horizontal surface, whereby to provide a rest position of inherent stability on a horizontal surface, with the restorations facing forwardly and upwardly.

8. In an articulator having an upper mounting plate attached to a bracket by a universal joint, said plate being associated with the lower part of the joint and said bracket being associated with the upper part of the joint, and the axis of said upper part of the joint being angularly variable with respect to the axis of lower part of the joint, means associated with said bracket and said upper part of the joint for providing substantial translational movement of said upper part of the joint relative to said bracket along a path transverse to the axis of said upper part of the joint, means associated with said plate and said lower part of the joint for providing translational movement of said plate relative to said lower part of the joint along a path transverse to the axis of said lower part of the joint, and single control means to lock said plate to said bracket in any of the possible translational positions of said plate and said bracket with respect to said joint and in any of the possible angular positions of the axes of said upper and lower parts of the joint with respect to each other.

ALBERT SHMUKLER.
HARRY BRONSTEIN.

References Cited in the file of this patent

UNITED STATES PATENTS

| Number | Name | Date |
|---|---|---|
| 1,637,934 | Gambill | Aug. 2, 1927 |
| 2,200,058 | Chott | May 7, 1940 |
| 2,348,606 | Cayo | May 9, 1944 |
| 2,423,522 | Shmukler et al. | July 8, 1947 |

FOREIGN PATENTS

| Number | Country | Date |
|---|---|---|
| 394,568 | Great Britain | June 29, 1933 |